(12) United States Patent
Propp et al.

(10) Patent No.: US 8,198,998 B1
(45) Date of Patent: Jun. 12, 2012

(54) IDENTIFICATION OF POWER LINE LOCATIONS BY POWER LINE SIGNATURES

(75) Inventors: Michael B. Propp, Brookline, MA (US);
David L. Propp, Thornhill (CA);
Khaled Saab, St-Dorothee (CA);
Donald Orrell, Mansfield, MA (US)

(73) Assignee: Adaptive Networks, Inc., Needham, MA (US)

( * ) Notice: Subject to any disclaimer, the term of this patent is extended or adjusted under 35 U.S.C. 154(b) by 534 days.

(21) Appl. No.: 12/359,051

(22) Filed: Jan. 23, 2009

Related U.S. Application Data

(60) Provisional application No. 61/022,874, filed on Jan. 23, 2008.

(51) Int. Cl.
*G08B 1/08* (2006.01)

(52) U.S. Cl. ........................................................ 340/538

(58) Field of Classification Search ............. 340/538.16, 340/310.11, 568.2, 568.3
See application file for complete search history.

(56) References Cited

U.S. PATENT DOCUMENTS

| | | | |
|---|---|---|---|
| 7,450,001 B2* | 11/2008 | Berkman | 370/463 |
| 7,965,195 B2* | 6/2011 | Deaver et al. | 340/660 |
| 2007/0091800 A1* | 4/2007 | Corcoran | 370/230 |
| 2008/0316004 A1* | 12/2008 | Kiko | 340/310.13 |

* cited by examiner

*Primary Examiner* — Phung Nguyen
(74) *Attorney, Agent, or Firm* — Fish & Richardson P.C.

(57) ABSTRACT

The location of a device on an electrical power line is identified using a power line characteristic, such as a power line impedance as a function of frequency, and/or a power line transfer function identified from the first device to a second device communicating with the first device over the electrical power line. Power line information is determined by receiving a signal from a first device, determining a power line transfer function based on the received signal, and determining power line information based on the determined power line transfer function.

12 Claims, 3 Drawing Sheets

IDENTIFICATION OF POWER LINE LOCATIONS BY POWER LINE SIGNATURES

CROSS-REFERENCE TO RELATED APPLICATION

This application claims priority to U.S. Provisional Patent Application Ser. No. 61/022,874 filed Jan. 23, 2008, and entitled "Identification Of Power Line Locations By Power Line Signatures," the contents of which are incorporated herein by reference.

TECHNICAL FIELD

The present disclosure generally relates to communication over electrical power lines.

BACKGROUND

Power line communication (PLC) (also called power line carrier communication, mains communication, power line telecom (PLT) communication, broadband over power line (BPL), or power line networking (PLN) communication) describes several different approaches for using electric power lines to communicate information.

SUMMARY

A method is implemented to identify a location of a device on an electrical power line. A system including a processor connected to a storage device is implemented for identifying a location of a device on an electrical power line. A computer storage medium stores a computer program configured to identify a location of a device on an electrical power line.

In one aspect, the location of the device on the electrical power line is identified using a power line characteristic. The power line characteristic includes a power line impedance as a function of frequency, and/or a power line transfer function identified from the first device to a second device communicating with the first device over the electrical power line. The location of the first device includes the location of an outlet which the first device is plugged into. The location of the outlet is associated with an identifier of the first device.

Implementations may include a first complex impedance inserted across the electrical power line at the location of the first device so that the first complex impedance is identified and the location of the first device on the electrical power line is identified. In some aspects, a second complex impedance is inserted across the electrical power line at the location of a second device communicating with the first device over the electrical power line. The second complex impedance is different from the first complex impedance. The second complex impedance across the electrical power line is identified and used to identify a location of the second device on the electrical power line.

A method is implemented to determine power line information. A system including a processor connected to a storage device is implemented for determining power line information. A computer storage medium stores a computer program configured to determine power line information.

In one aspect, power line information is determined by receiving a signal from a first device, determining a power line transfer function based on the received signal, and determining power line information based on the determined power line transfer function.

In some aspects, the power line information includes a location of the first device on the electrical power line, and/or diagnostic information. The diagnostic information includes a status of the first device and/or electrical power line. The power line information is determined by comparing the determined power line transfer function to a reference power line transfer function.

Details of one or more implementations are set forth in the accompanying drawings and the description below. Other aspects can be implemented in systems and computers and will be apparent from the description and drawings, and from the claims.

DESCRIPTION OF DRAWINGS

Like reference numbers represent corresponding parts throughout.

DETAILED DESCRIPTION

Figure 1:
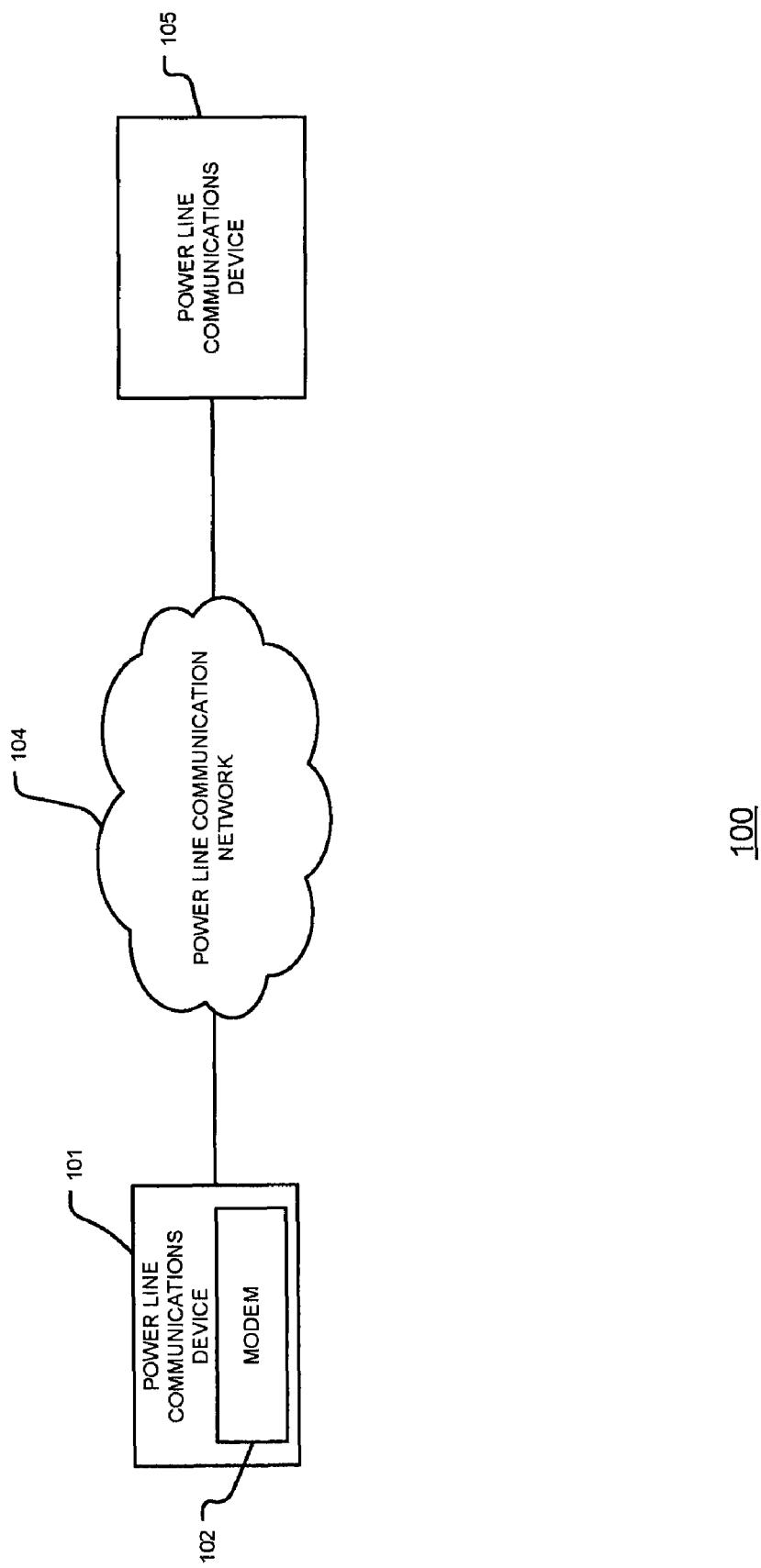
FIG. 1 is a block diagram of an exemplary system, according to one general implementation.

FIG. 1 is a block diagram of an exemplary system 100, according to one general implementation. The system 100 includes a first power line communications device 101 (including a modem 102, such as a power line modem), a power line communication network 104, and a second power line communication device 105. The power line communication network 104 may be an electrical power line.

The first power line communications device 101 communicates with the second power line communications device 105 over the power line communication network 104 by transmitting particular information-carrying signals, which are received or otherwise detected by the second power line communications device 105 or by another system. In such a network 104 or system 100 of power line communications devices, an enhanced approach can be applied to identify the particular physical location of any device, such as the physical location of power line communications devices 101 and 105. For example, when the first power line communications device 101 is plugged into a power outlet, it could be useful to identify the outlet location and associate the outlet location with the address of the first power line communications device 101 plugged into that particular outlet. In another example, the physical location of any device, such as the physical location of power line communications devices 101 and 105, can be determined along an electrical power line.

A second enhanced approach can be applied to determine diagnostic information about any device, such as the first power line communications device 101, and/or the electrical power line. For example, the diagnostic information can be the status of the first power line communications device 101 and/or the electrical power line. The status can indicate the health of and/or damage to the first power line communications device 101 and/or the electrical power line.

The physical location of a power line communications device and/or outlet can be determined as a latitude and longitude coordinates, a distance along the power line communication network from a reference point, such as the distance along the power line communication network of the device and/or outlet from another device, a distance marker along the power line communication network, an alphanumerical identifier of the outlet, and/or an identifier of a building in which the device and/or outlet is located.

To associate the outlet location with the address of the first power line communications device 101, a database structure can be used to store the physical location of the outlet and an identifier of the first power line communications device 101. If, for example, the latitude and longitude coordinates of the outlet are identified, the coordinates can be saved in the database structure with an identifier of the first power line communications device 101.

The identification of the location on an electrical power line of the first power line communications device 101 is accomplished by identifying the power line impedance as a function of frequency at the location of the first power line communications device 101 or the power line transfer function from the first power line communications device 101 to the second power line communications device 105, to which the first power line communications device 101 is communicating.

In some implementations, the power line impedance can be identified by an impedance detector located at the first power line communications device 101, the second power line communications device 105, or at another location within the power line communication network 104. In other implementations, the power line impedance can be identified by complex division of a voltage determine by a voltage detector and a current determined by a current detector.

The signal processing capability of a power line communications device may include the ability to compute a Fourier transform or fast Fourier transform (FFT) or other frequency analysis. As such, and in accordance with one general implementation, the power line impedance may be determined by the device whose location is to be identified transmitting a signal, such as a wideband signal, and simultaneously processing the signal. For instance, the power line impedance may be determined by the first power line communications device 101.

In a further example implementation, the power line transfer function may be determined by the device processing the received signal from such a transmission by the device whose location is to be identified. For instance, in some embodiments, the power line transfer function may be determined by the second power line communications device 105. In other embodiments, the power line transfer function may be determined by another system that receives a signal from the device whose location is to be identified.

In other examples, the frequency spectrum of a received signal, such as a signal received from the first power line communications device 101, may be analyzed to determine the location and/or the diagnostic information. For example, if the received signal from the first power line communications device 101 is a wideband signal, the range of frequencies in the wideband signal can be analyzed to determine the location of and/or the diagnostic information for the device.

In some implementations, to determine the diagnostic information for the first power line communications device 101 or the electrical power line, the transfer function determined for the first power line communications device 101 at a most recent time can be compared to a predetermined or reference transfer function for the first power line communications device 101. Any differences determined between the transfer functions as a result of the comparison can be used to determine the diagnostic information. For example, the difference between the determined transfer function and a reference transfer function may indicate that the health status of the first power line communications device 101 is poor.

To increase the likelihood that each location may be identified, in some implementations, the location identification may then be accomplished for a power line by inserting a complex impedance, such as (by way of example) a capacitor in series with an inductor and/or resistor across the power line at the location of the device to be identified, and setting the values of the complex impedance to be specific for each location. As such, a power line signature is created at each location.

In other implementations, a device sending a signal over the power line communication network 104 to another device can include a frequency-dependent signal in the signal to serve as a device-specific signature. For example, the first power line communications device 101 can append a particular frequency dependent signal to the wideband signal sent over the power line communication network 104 to the second power line communications device 105. The frequency dependent signal affects the transfer function determined from the signal and serves as a signature specific to the first power line communications device 101.

Alternatively, for a specific electrical power line, each location can be mapped into the power line impedance at its location or the power line transfer function to another device, which can then be used to identity the location of each device. Notably, and in addition to identifying the location of the power line communication device, this information may also be used as information on the condition or quality of the power line, for example, with respect to its ability to deliver electrical power.

As an example, consider three devices connected to the power line. When a complex impedance is inserted across the power line at the location of the first device to be identified, the power line impedance as a function of frequency at the location of the device may have one or more notches or alternatively, peaks, over a particular range of frequencies such that this range of frequencies is determined by the complex impedance inserted across the power line. The combination of notches or peaks can be a signature of the device. In some implementations, the power line impedance as a function of frequency at the location of the device can have a predetermined shape or signature as a result of the complex impedance.

Similarly the power line transfer function from this device to a third device to which it is communicating could have one or more notches or alternatively, peaks, over a particular range of frequencies such that this range of frequencies is determined by the complex impedance. For another, second location, a different complex impedance is inserted across the power line at the location of this second device to be identified, so the power line impedance as a function of frequency at the location of this second device would have one or more notches or alternatively, peaks, over a different range of frequencies such that this different range of frequencies is determined by this different complex impedance inserted across the power line. The different combinations of notches or peaks can be signatures of the devices. In some implementations, the power line impedance as a function of frequency at the location of the devices can have predetermined shapes or signatures as a result of the complex impedances.

Similarly the power line transfer function from this second device to the third device to which it is also communicating can have notches or alternatively, peaks, over a different range of frequencies such that this different range of frequencies is determined by this different complex impedance. These complex impedances inserted across the power lines at each location in this example would be chosen to be sufficient to allow the power line impedance at the location or the transfer function to a third device to be identified for each location, but would also be chosen to not impair the power line communication to any significant degree.

Combinations of one or more notches or peaks, or predetermined shapes within the power line impedance and/or the power line transfer function can be detected by a filter and/or comparator circuit, or by an algorithm, such as a pattern recognition algorithm, performed by a processor. The algorithms may compute a Fourier transform, FFT, or other frequency analysis.

Figure 2:
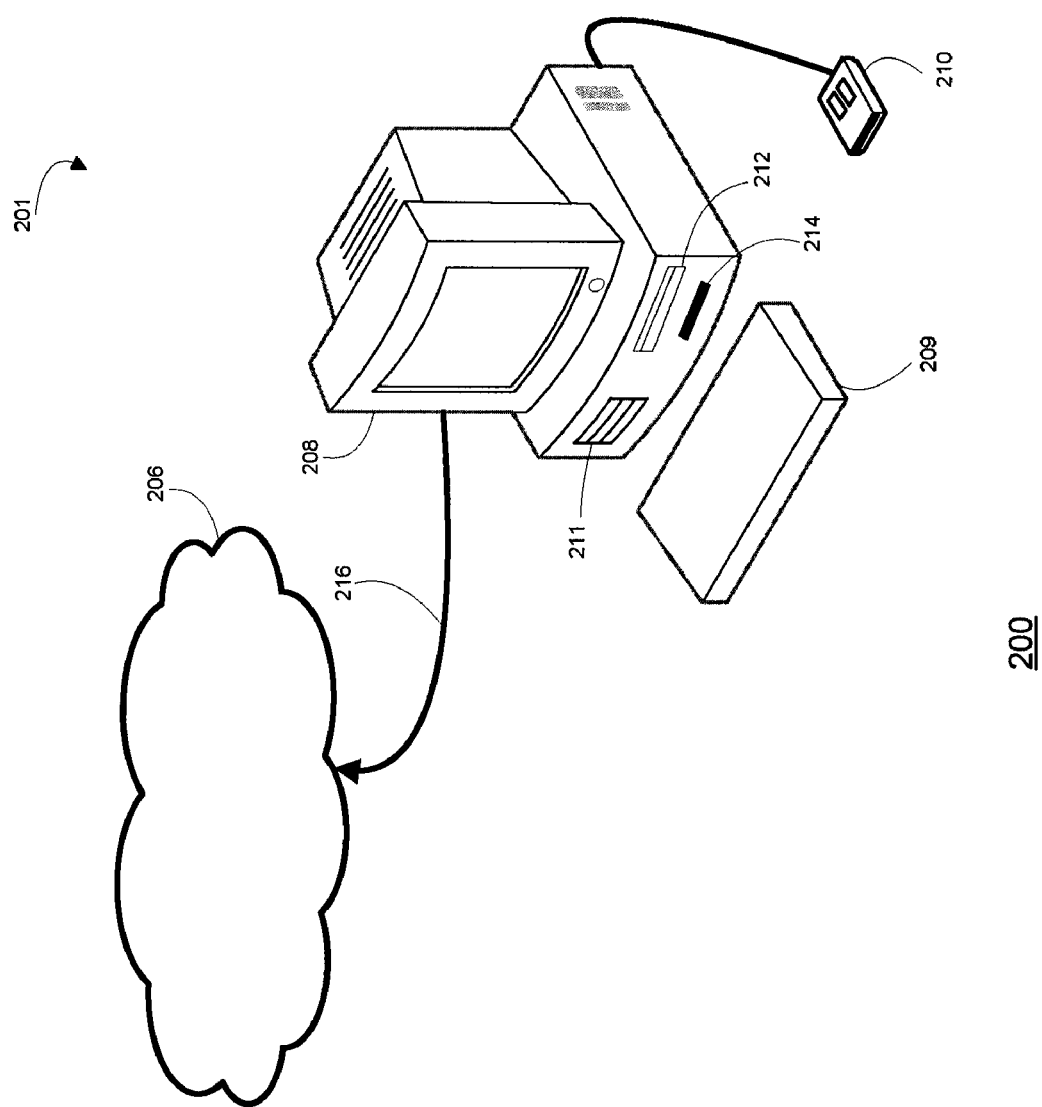
FIG. 2 illustrates the exterior appearance of an exemplary system, according to another general implementation.

FIG. 2 illustrates the exterior appearance of an exemplary system 200 that implements the identification of power line locations by power line signatures. In more detail, the hardware environment of the device 201 (a power line communications device) includes a display monitor 208 for displaying text and images to a user, a keyboard 209 for entering text data and user commands into the device 201, a mouse 210 for pointing, selecting and adjusting objects displayed on the display monitor 208, a fixed disk drive 211, a removable disk drive 212, tape drive 214, a hardcopy output device, and a computer network connection 216.

The display monitor 208 displays graphics, images, and text that comprise the display for the software applications used by the device 201, as well as the operating system programs necessary to operate the device 201. A user uses the keyboard 209 to enter commands and data to operate and control the computer operating system programs, the web browser, and/or the engine or application used to provide identification of power line locations by power line signatures. The user uses the mouse 210 to select and adjust graphics and text objects displayed on the display monitor 208 as part of the interaction with and control of the device 201 and applications running on the device 201. The mouse 210 is any type of pointing device, and may be a joystick, a trackball, a touch-pad, or other pointing device.

In a further implementation, the fixed disk drive 211 itself may include a number of physical drive units, such as a redundant array of independent disks ("RAID"), or may be a disk drive farm or a disk array that is physically located in a separate computing unit. Such computer readable memory media allow the device 201 to access computer-executable process steps, application programs and the like, stored on removable and non-removable memory media.

The wireless or wireline computer network connection 216 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, a PLC network connection, a power line carrier network connection, a mains communication network connection, a BPL network connection, a PLT network connection, a PLN connection, or a satellite connection. The network 206 may be one or more of a LAN network, a corporate or government WAN network, the Internet, a public utility network, a power line network, or other network.

The computer network connection 216 uses a wireline or wireless connector. Example wireless connectors include, for example, an INFRARED DATA ASSOCIATION® (IrDA®) wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 212 is a removable storage device that is used to off-load data from the device 201 or upload data onto the device 201. The removable disk drive 212 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 211 or on removable media for the removable disk drive 212.

The tape drive 214 is a tape storage device that is used to off-load data from the device 201 or to upload data onto the device 201. The tape drive 214 may be a quarter-inch cartridge ("QIC"), 4 mm digital audio tape ("DAT"), 8 mm digital linear tape ("DLT") drive, or other type of tape.

Furthermore, although the device 201 is illustrated in FIG. 2 as a desktop PC, in further implementations the device 201 may be a laptop, a workstation, a midrange computer, a mainframe, an embedded system, telephone, a handheld or tablet computer, a PDA, or other type of computer.

Figure 3:
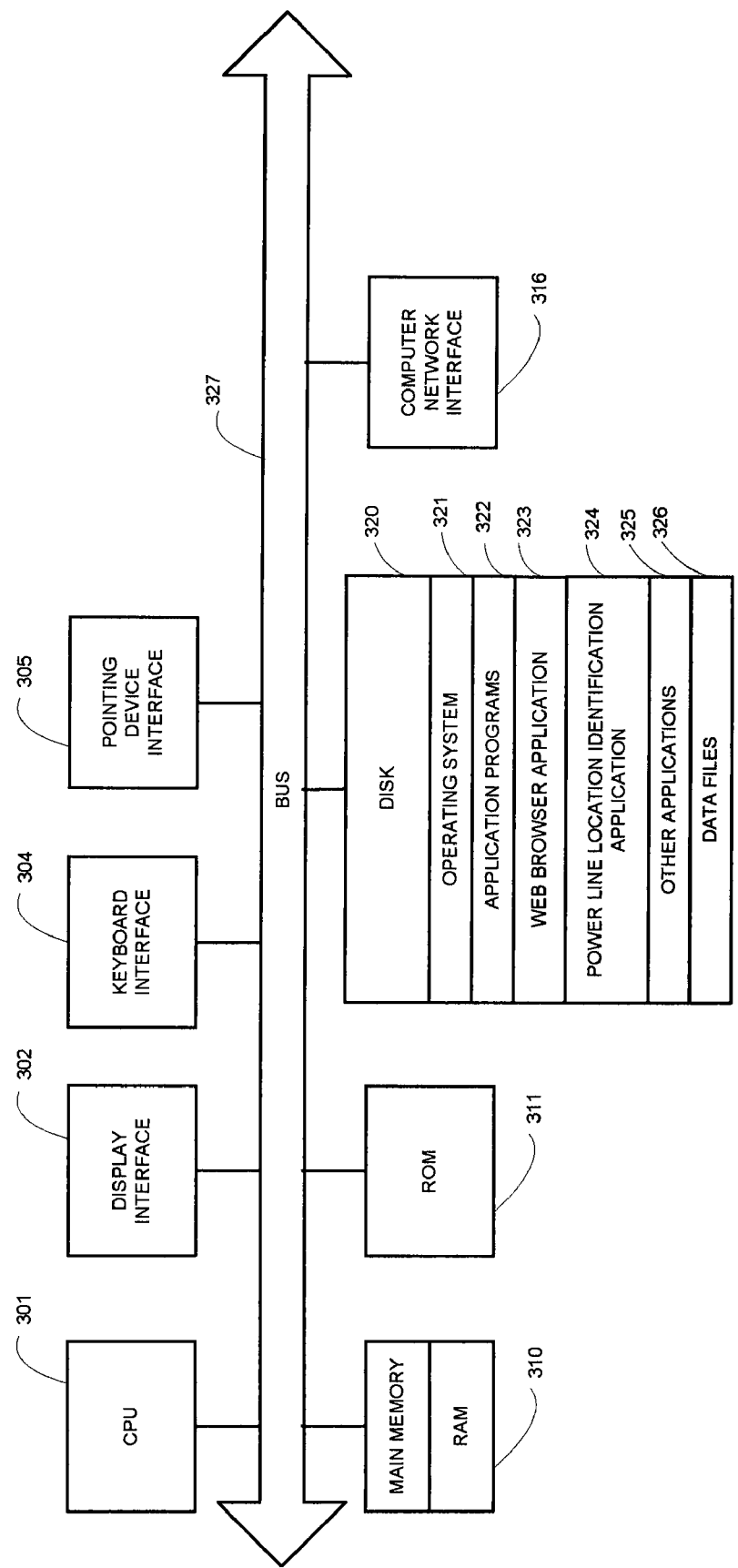
FIG. 3 is a block diagram illustrating the internal architecture of the device shown in FIG. 2.

FIG. 3 is a block diagram illustrating the internal architecture of one computer shown in FIG. 2 The computing environment includes a computer central processing unit ("CPU") 301 where the computer instructions that comprise an operating system or an application are processed; a display interface 302 which provides a communication interface and processing functions for rendering graphics, images, and texts on the display monitor 208; a keyboard interface 304 which provides a communication interface to the keyboard 209; a pointing device interface 305 which provides a communication interface to the mouse 210 or an equivalent pointing device; a random access memory ("RAM") 310 where computer instructions and data are stored in a volatile memory device for processing by the computer CPU 301; a read-only memory ("ROM") 311 where invariant low-level systems code or data for basic system functions such as basic input and output ("I/O"), startup, or reception of keystrokes from the keyboard 209 are stored in a non-volatile memory device; a storage 320 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 321, application programs 322 (including web browser application 323, power line location identification application engine 324, and other applications 325 as necessary) and data files 326 are stored; and a computer network interface 316 which provides a communication interface to the network 206 over the computer network connection 216. The constituent devices and the computer CPU 301 communicate with each other over the computer bus 327.

The RAM 310 interfaces with the computer bus 327 so as to provide quick RAM storage to the computer CPU 301 during the execution of software programs such as the operating system application programs, and device drivers. More specifically, the computer CPU 301 loads computer-executable process steps from the fixed disk drive 211 or other media into a field of the RAM 310 in order to execute software programs. Data is stored in the RAM 310, where the data is accessed by the computer CPU 301 during execution.

Also shown in FIG. 3, the device 201 stores computer-executable code for a operating system 321, and application programs 322 such as word processing, spreadsheet, presentation, gaming, web browsing, JavaScript engine, or other applications. Although it is possible to provide for the identification of power line locations by power line signatures using the above-described implementation, it is also possible to implement the functions according to the present disclosure as a dynamic link library ("DLL"), or as a plug-in to other application programs such as an Internet web-browser such as the APPLE® SAFARI®web browser or the MICROSOFT® INTERNET EXPLORER® web browser.

The computer CPU 301 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 301 is more than one processing unit, including a multiple CPU configuration found in high-performance workstations and servers, or a multiple scalable processing unit found in mainframes.

The operating system 321 may be APPLE® MAC OS X® for INTEL® and POWERPC® based workstations and servers; MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers; SYMBIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 321 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

While FIGS. 2 and 3 illustrate one possible implementation of a computing system that executes program code, or program or process steps, configured to effectuate the identification of power line locations by power line signatures, other types of computers may also be used as well.

While FIG. 1 illustrates two power line communications devices, three or more power line communications devices may be included in the system 100. For example, in addition to communicating with the second power line communications device 105, the first power line communications device 101 can communicate with a third power line communications device over the power line communication network 104, or over another power line communication network.

In some implementations, a signal received over a power line communication network can be corrected before being used to determine the complex impedance. For example, the signal can be passed through a low-pass, high-pass, and/or band-pass filter to remove noise from the signal.

A number of implementations have been described. Nevertheless, it will be understood that various modifications may be made without departing from the spirit and scope of the disclosure. Accordingly, other implementations are within the scope of the following claims.

What is claimed is:

1. A method for identifying a location of a device on an electrical power line, the method comprising:
   identifying a power line characteristic;
   inserting a first complex impedance across the electrical power line at the location of the first device;
   identifying a location of a first device on an electrical power line based on the identified power line characteristic, wherein identifying the power line characteristic comprises identifying the first complex impedance, and
   identifying the location of the first device on the electrical power line based on the identified power line characteristic comprises identifying the location of the first device on the electrical power line based on the identified first complex impedance.

2. The method of claim 1, wherein identifying the power line characteristic comprises identifying power line impedance as a function of frequency.

3. The method of claim 1, wherein identifying the power line characteristic comprises identifying a power line transfer function from the first device to a second device communicating with the first device over the electrical power line.

4. The method of claim 1, wherein identifying the location of the first device comprises identifying a location of an outlet which the first device is plugged into.

5. The method of claim 4, further comprising associating the location of the outlet with an identifier of the first device.

6. The method of claim 1, further comprising:
   inserting a second complex impedance across the electrical power line at the location of a second device communicating with the first device over the electrical power line, the second complex impedance being different from the first complex impedance.

7. The method of claim 6, further comprising:
   identifying the second complex impedance across the electrical power line; and
   identifying a location of the second device on the electrical power line based on the identified second complex impedance.

8. A system for identifying a location of a device on an electrical power line, the system comprising a processor connected to a storage device, wherein the processor is configured to:
   identify a power line characteristic; and
   identify a location of a first device on an electrical power line based on the identified power line characteristic, wherein the processor is configured to:
   identify the power line characteristic by identifying a first complex impedance inserted across the electrical power line at the location of the first device, and
   identify the location of the first device on the electrical power line based on the identified power line characteristic by identifying the location of the first device on the electrical power line based on the identified first complex impedance.

9. The system of claim 8, wherein the processor is configured to identify the power line characteristic by identifying power line impedance as a function of frequency.

10. The system of claim 8, wherein the processor is configured to identify the power line characteristic by identifying a power line transfer function from the first device to a second device communicating with the first device over the electrical power line.

11. The system of claim 8, wherein the processor is configured to identify the location of the first device by identifying a location of an outlet which the first device is plugged into.

12. The system of claim 8, the processor further being configured to:
- identify a second complex impedance inserted across the electrical power line at a location of a second device communicating with the first device over the electrical power line, the second complex impedance being different from the first complex impedance; and
- identify the location of the second device on the electrical power line based on the identified second complex impedance.

* * * * *